United States Patent

[11] 3,585,841

| [72] | Inventors | William E. Brandau<br>Westwood;<br>Anthony E. Napp, Woodcliff Lake, both of, N.J. |
|---|---|---|
| [21] | Appl. No. | 39,818 |
| [22] | Filed | May 22, 1970<br>Division of Ser. No. 778,188, Nov. 22, 1968, Pat. No. 3,548,662. |
| [45] | Patented | June 22, 1971 |
| [73] | Assignee | The Bendix Corp. |

[54] SELF-CALIBRATING PRESSURE RATIO MEASUREMENT SYSTEM
8 Claims, 1 Drawing Fig.

[52] U.S. Cl. .................................................. 73/4, 73/398
[51] Int. Cl. .................................................. G01j 27/00
[50] Field of Search .................................... 73/398, 4, 407 PR

[56] References Cited
UNITED STATES PATENTS
3,104,540  9/1963  Vitale........................... 73/4

Primary Examiner—Donald O. Woodiel
Attorneys—Peter C. Van Der Sluys and Plante, Hartz, Smith and Thompson ABSTRACT: A strain gauge pressure-sensing means senses a first pressure and provides an excitation voltage inversely corresponding to the first pressure. The excitation voltage is applied through a pair of potentiometers to a pair of strain gauge pressure sensors for excitation of the sensors which alternately sense the first pressure and a second pressure through a pressure-switching means. The pressure sensors provide output signals corresponding to the sensed pressure and the excitation so that the signals therefrom correspond to the ratio of the first and second pressures when the second pressure is sensed and correspond to unity when the first pressure is sensed. A switching circuit connects the signal from the sensor sensing the first pressure to an amplifier which compares the signal with a unity reference signal and amplifiers any difference. The amplifier energizes a motor which drives a wiper of the potentiometer associated with the sensor sensing the first pressure to vary the excitation thereto so that the output therefrom corresponds to unity, whereby each sensor is alternately compensated for unstable characteristics and calibrated with the pressure sensing means.

INVENTORS
WILLIAM E. BRANDAU
ANTHONY E. NAPP
BY
AGENT

SELF-CALIBRATING PRESSURE RATIO MEASUREMENT SYSTEM

CROSS REFERENCE TO RELATED APPLICATIONS

The present application is a division of copending U.S. Application Ser. No. 778,188, filed Nov. 22, 1968 now U.S. Pat. No. 3,548,662 by William E. Brandau and Anthony E. Napp for a Pressure Ratio Measurement System. The filing date of the prior application is claimed in that the subject matter of the present application was disclosed and claimed therein and was subject to restriction.

BACKGROUND OF THE INVENTION

1. Field of the Invention

This invention relates to a pressure ratio measurement system using strain gauge pressure sensors and more particularly to such a device having means for self-calibration.

2. Description of the Prior Art

Heretofore strain gauge pressure sensors were not used in devices requiring long-time accuracy, such as aircraft altimeters and air speed indicators, because of inherent unstable calibration characteristics caused by temperature, hysteresis and component changes. Strain gauge pressure sensors are well known in the art of pressure measuring and have many outstanding advantages notably small size, fast response, low cost and excellent vibration immunity. But because of the unstable calibration characteristics these advantages have not been realized in systems requiring long-time accuracy.

Several methods of sensing and computing pressure ratios have been used in the prior art; however, all of these methods require mechanical devices susceptible to inaccuracies caused by vibration, hysteresis and friction.

The present invention provides an electrical pressure ratio measurement system that is free from the inaccuracies inherent in mechanical systems and is self-calibrating for elimination of inherent unstable calibration characteristics of strain gauge pressure sensors thereby making it possible to take advantage of their small size, fast response, low cost and vibration immunity in pressure ratio measurement systems requiring long time accuracy.

SUMMARY OF THE INVENTION

The present invention contemplates a self-calibrating pressure ratio measurement system for providing an output corresponding to the ratio of first and second pressures. The invention is contemplated for use with strain gauge pressure sensors which are uneffected by the inaccuracies of the prior art but are plagued with inherent unstable long time calibration characteristics. The invention provides a system having three sensors and a calibration means.

A master strain guage pressure sensor senses the first pressure and is effective to establish a common excitation varying as the inverse of the first pressure. A pair of strain gauge pressure sensors are excited by the output of the master sensor and are arranged so that one sensor senses the first pressure and the other sensor senses the second pressure and a pressure-switching means periodically switches the pressures between the two sensors. The sensors provide outputs corresponding to the excitation and the sensed pressure. The output of the sensor sensing the second pressure corresponds to the ratio of the first and second pressures. The output of the sensor sensing the first pressure is compared with a unity reference voltage and the excitation thereto is adjusted so that the output equals the unity reference voltage, whereby the sensors are alternately calibrated with the master sensor.

One object of the invention is to provide a pressure ratio measurement device that is not effected by vibration, hysteresis, friction and temperature.

Another object of the invention is to provide a pressure ratio measurement device using a strain-gauge-type sensor.

Another object of the invention is to provide a system for continuous compensation of the inherent unstable characteristics of strain gauge pressure sensors.

DESCRIPTION OF THE INVENTION

Figure 1:
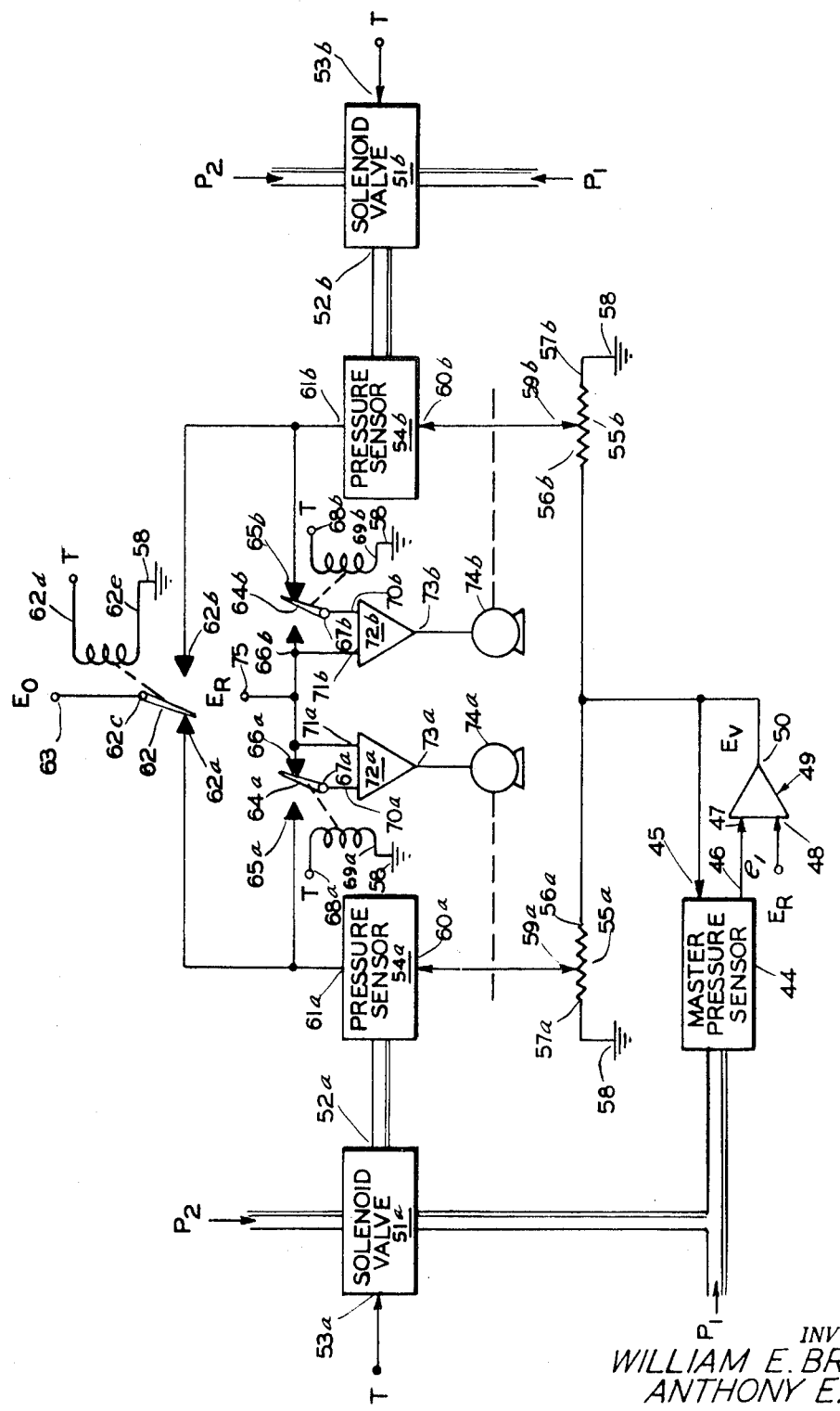
FIG. 1 is a schematic diagram of a self-calibrating pressure ratio measurement system constructed in accordance with the present invention.

Referring to FIGURE 1 there is shown a pressure ratio measurement system having strain gauge pressure sensors and means for compensating for unstable calibration characteristics. A pressure $P_1$ is connected to a master strain gauge pressure sensor 44 having an excitation terminal 45 and an output terminal 46 connected to an input 47 of an operational amplifier 49. A unity reference voltage $E_R$ is supplied to an input 48 of operational amplifier 49. Operational amplifier 49 has an output 50 connected to the excitation terminal 45 for providing a variable excitation voltage $E_V$ to sensor 44. Sensor 44 generates an output voltage $e_1$ corresponding to the excitation voltage $E_V$ and the pressure $P_1$. Operational amplifier 49 varies the excitation voltage $E_V$ to maintain the output voltage $e_1$ at a unity level, thus $E_V$ inversely corresponds to pressure $P_1$.

Pressure $P_1$ and a pressure $P_2$ are connected to a pair of three way solenoid valves 51a and 51b0 having output ports 52a and 52b and terminals 53a and 53b to which a timing signal T is applied. The valves are responsive to signal T to alternately switch pressures $P_1$ and $P_2$ to the output ports. Valves 51a and 51b are arranged so that when $P_1$ is at one output port $P_2$ will be at the other. Two strain gauge pressure sensors 54a and 54b are connected to output ports 52l and 52b respectively. Pressure sensors 54a and 54b are of the type that provide an electrical output corresponding to the pressure and excitation applied thereto.

A pair of potentiometers 55a and 55b have a pair of terminals 56a and 56b connected to output 50 and a pair of terminals 57a and 57b connected to a ground 58. The two potentiometers have a pair of wipers 59a and 59b connected to a pair of input terminals 60a and 60b of sensors 54a and 54b for providing excitation voltage $E_V$ thereto. Thus sensors 54a and 54b provide an output voltage corresponding to voltage $E_V$ and the pressure applied thereto. Sensors 54a and 54b have a pair of output voltage terminals 61a and 61b connected to a pair of terminals 62a and 62b of a relay 62. Relay 62 has a terminal 62c connected to an output terminal 63 and a terminal 62e connected to ground 58. Timing signal T is applied to a terminal 62d of relay 62, the relay being responsive thereto for alternately connecting output terminal 63 to terminals 61a and 61b so that terminal 63 is always connected to the sensor sensing pressure $P_2$. Thus voltage $E_O$ continuously corresponds to the ratio of pressures $P_1$ and $P_2$.

The means of compensating unstable calibration characteristics is identical for both sensors, therefore only the compensation means for sensor 54a will be described. A relay 64a has a terminal 65a connected to terminal 61a of the sensor 54a and a terminal 66a connected to a terminal 75 which provides the unity reference voltage $E_R$. Relay 64a has a terminal 67a connected to an input 70a of a servoamplifier 72a. Terminal 66a of relay 64a is also connected to an input 71a of servoamplifier 72a. Timing signal T is applied to a terminal 68a of relay 64a. A terminal 69a is connected to ground 58. Relay 64a is responsive to the timing signal to alternately connect the input 70a of servoamplifier 72a to the terminal 61a when pressure $P_1$ is connected to sensor 54a and to short input 70a to input 71a when pressure $P_2$ is connected to sensor 54a. Servoamplifier 72a has an output terminal 73a connected to a motor 74a which is responsive to signals therefrom. Motor 74a is driveably connected to wiper 59a of potentiometer 55a. When both sensor 44 and 54a are connected to pressure $P_1$ the output of sensor 54a should be unity. Amplifier 72a senses any difference between the output of sensor 54a and the unity reference voltage and is responsive thereto for exciting motor 74a. Motor 74a moves wiper 59a thereby adjusting the excitation to sensor 54a until output therefrom equals unity. Thus the excitation to sensor 54a is adjusted to exactly compensate for any sensor calibration changes. When pressure $P_2$ is connected to sensor 54a relay 64a shorts inputs 70a and 71a of the servoamplifier thereby disabling motor 74a. Sensor 54b is calibrated in a similar manner by adjusting the excitation when pressure $P_1$ is connected thereto. Thus, while one sensor is calibrated the other sensor is supplying output voltage $E_o$ corresponding to the ratio of pressure $P_1$ and $P_2$.

A device constructed according to the present invention will provide an output corresponding to the ratio of two pressures. The accuracy of the device will be independent of friction, hysteresis, vibration or temperature changes. The system is self-calibrating to overcome inherent unstable calibration characteristics of strain gauge pressure sensors.

What we claim is:

1. A pressure ration measurement device for providing an output corresponding to the ratio of first and second pressures, comprising:

master pressure sensing means for sensing the first pressure and providing an excitation signal inversely corresponding to the first pressure;

a pair of pressure sensors of a type that have an output providing a signal corresponding to a sensed pressure an an excitation signal, said sensors connected to the master pressure sensing means for receiving the excitation signal therefrom;

pressure-switching means for alternately switching the first and second pressures between the pair of pressure sensors so that the sensors alternately sense the first and second pressures, whereby the sensor sensing the first pressure provides a signal corresponding to unity and the sensor sensing the second pressure provides a signal corresponding to the ratio of the first and second pressures;

a reference voltage source providing a voltage corresponding to unity; and calibration means for comparing the signal from the sensor sensing the first pressure with the unity reference voltage and for varying the sensor excitation to compensate for any difference between the unity reference voltage and the signal, whereby the sensors are alternately calibrated with the master pressure sensor.

2. A device as described in claim 1, additionally comprising switch means for connecting to the sensor sensing the second pressure and for providing a continuous output corresponding to the ratio of the first and second pressures.

3. A device as described in claim 2, additionally comprising a source providing a timing signal said pressure switching means and switching means being actuated in response to the timing signal.

4. A device as described in claim 1, wherein each pressure sensor and the master pressure sensing means include strain gauge pressure sensors.

5. A device as described in claim 1, wherein the master pressure sensing means comprises:

pressure-sensing means responsive to the excitation signal and the first pressure for providing an electrical output corresponding thereto; and means for providing the excitation signal said means having an input connected to the reference voltage source for receiving the reference voltage and an input connected to the last-mentioned pressure-sensing means for receiving the electrical output therefrom said means responsive to the received signals to vary the excitation signal so that it inversely corresponds to the first pressure.

6. A device as described in claim 1, wherein the calibration means comprises:

a pair of potentiometers connecting the master pressure sensing means to each of the pair of pressure sensors;

a pair of motors arranged to drive the potentiometers;

a pair of amplifiers for providing excitation signals to the motors, each amplifier having a first input connected to the reference voltage source and a second input; and switching means for connecting the second input to the output of the associated pressure sensor when the sensor is sensing the first pressure and for connecting the second input to the first input when the sensor is sensing the second pressure, whereby the amplifiers sense any difference between the sensor outputs and the reference voltage and in response thereto excite the motors to drive the potentiometers until the sensor output equals the unit reference voltage.

7. A device as described in claim 6, wherein said switch means also connects the output of the sensor sensing the second pressure to an output terminal so that a continuous output is provided corresponding to the ratio of the first and second pressures.

8. A device as described in claim 7, additionally comprising a source providing a timing signal said pressure switching means and switching means being actuated in response to the timing signal.